Feb. 10, 1931.  B. ATKINSON  1,792,266
ADJUSTABLE LEVEL
Filed Jan. 28, 1929
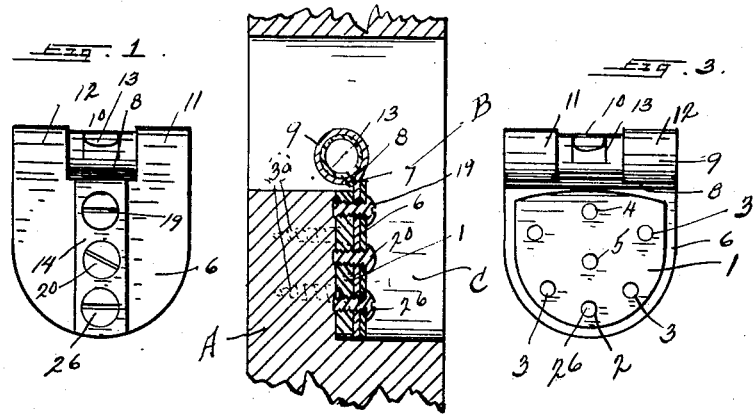
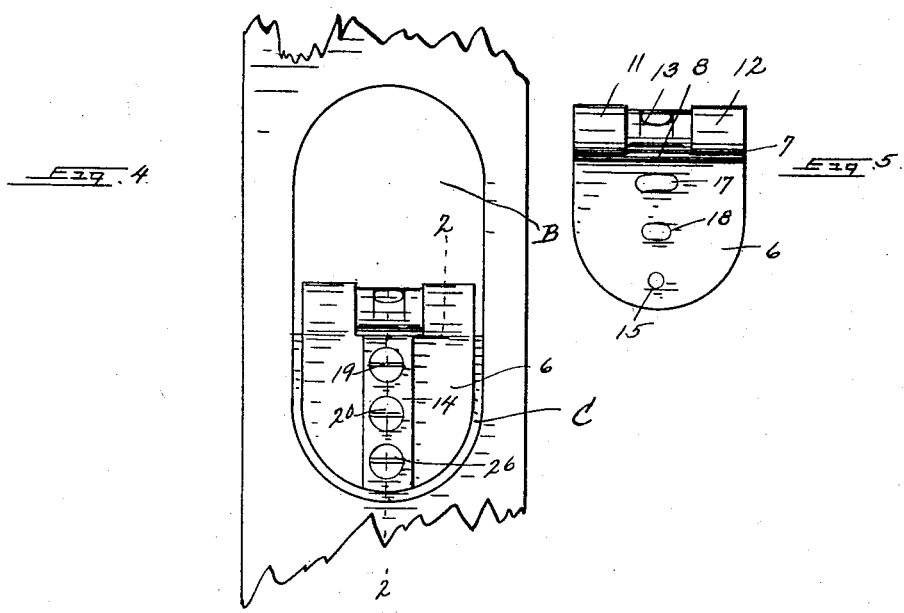
Inventor
Benjamin Atkinson
By  R. M. Thomas
Attorney Patented Feb. 10, 1931

1,792,266

UNITED STATES PATENT OFFICE

BENJAMIN ATKINSON, OF SALT LAKE CITY, UTAH

ADJUSTABLE LEVEL

Application filed January 28, 1929. Serial No. 335,502.

My invention relates to levels and has for its objects to provide a new and efficient level for masons, bricklayers or for any other purpose where a true level is required.

A further object is to provide a level which will be adjustable so that weather conditions, dampness, accidental dropping and other accidents will not ruin the level.

A still further object is to provide a full vision spirit level which will last longer, be more easily installed, and one which will be reinforced so that accidents will not affect the spirit glass, by twisting or bending the base thereby breaking the glass.

These objects I accomplish with the device illustrated in the accompanying drawings in which similar numerals and letters of reference indicate like parts thorughout the several views and as described in the specification forming a part of this application and pointed out in the appended claims.

In the drawings in which I have shown the best and most preferred manner of building my invention Figure 1 is a front elevation of the level. Figure 2 is a section on line 2—2 of Figure 4. Figure 3 is a reverse view from that shown in Figure 1. Figure 4 is a front elevation of the level in place ready for use. Figure 5 is a back view of the level removed from the securing plate.

In the drawings I have shown the frame of the level as A and the hole in which the level is secured as B, with a step cut C on one end of the said hole in and against the face of the step of which I mount the securing plate 1 of the device. The said plate 1 has the top end thereof slightly rounded in an arc with a pivot hole 2, in the lower end thereof. Holes 3 are bored through the plate 1 by which it is secured to the base or frame of the level A, and threaded holes 4 and 5 are bored through the said plate 1. The body 6 of the level is made of a sheet of metal with the top end bifurcated and the ends 11 and 12 bent into circular sockets and with the edge 7 of the ends bent inwardly toward the body and secured to a brace bar 8 which brace bar is made of steel and is the full width of the body 6. The edges 7 of the ends 11 and 12 are brought against the outer face of the bar 8 and the inner face of the bar rests against the body 6. The bar is then welded or soldered to the body 6 and to the edges 7 of the ends 11 and 12 making two spaced apart cylindrical sockets 9 in the top end of the body with the reinforcing bar 8 running the full length of the two sockets and the intervening space therebetween. An opening 10 for full vision of the spirit glass is thereby provided between the two spaced apart sockets 9. A spirit glass 13 is then placed in the two sockets 9 and across the opening 10 and the ends of the sockets 9 are then filled with plaster of Paris, or some other cement, to hold the glass permanently therein. A brace clamp plate 14 is bored with three holes therein in longitudinal alignment and spaced in alignment with the holes 4 and 5. The hole 15 is bored through the body 6 in alignment with the hole 2 in the plate 1 and in radial alignment with the holes 4 and 5 and the hole 2 through the plate is threaded. A pivot screw 26 is then placed through the hole 15 with the plate 14 between the head of the screw and the body 6, and the screw is screwed into the hole; this provides a pivot between the body 6 and the plate 1. With the hole 15 as an axis of a circle two semi-circular arc shaped holes 17 and 18 are cut through the body 6 with the holes in alignment with the holes 4 and 5 respectively. This provides a means for axial adjustment, around the pivot screw 15. The holes 4 and 5 being in alignment with the holes 17 and 18 and the holes in the plate 14, adjustment screws 19 and 20 are then placed through the plate 14, the body 6 and into the holes 4 and 5 and are screwed therein to hold the two plates together and to make it possible to adjust the body 6 to the plate 1. Screws 3a are passed through the holes 3 to secure the plate 1 to the body of the level.

The installation of the device is obvious and the adjustment is made by loosening the screws 15, 19, and 20 in the holes 4 and 5 and moving the body 6 on its axis pivot 15, in either direction necessary and then tightening the screws again securing the two plates together. The clamp plate 14 acts as a washer for the screws and also as a brace plate for the body 6 and aids in clamping the body 6 and the plate 1 together.

Having thus described my invention I desire to secure by Letters Patent and claim:—

1. In a level the combination of a frame; a securing plate having means to secure it to said frame; an upright body member pivoted to said plate and having arch shaped holes therein, said body having the top end bifurcated and bent into two cylindrical spaced apart sockets; a spirit glass secured in said sockets; a brace rod formed across the width of the body and sockets, and rigidly secured to both body and sockets; there being holes through said plate in alignment with the arc shaped holes through said body; adjustment screws through said holes; a pivot screw through said body and said plate and a brace plate secured to said body by the screws and the pivot screw, to aid in adjusting the two plates together and to strengthen the body.

2. In a level the combination of an upright body having the top end thereof bifurcated and bent into two spaced apart sockets; a brace bar secured across said body and said sockets and secured rigidly thereto; and spirit glass secured in said sockets in full vision of the user.

3. In a level the combination of an upright body having spaced apart cylindrical sockets in the top end thereof; a brace bar across said sockets and said body member and secured rigidly to both; a spirit glass secured in said sockets with the vision area fully open; means to secure the body to a level adjustably; and a brace plate to strengthen the body and aid in holding the lever adjusted.

In testimony whereof I have affixed my signature.

BENJAMIN ATKINSON.